United States Patent
Tang

(10) Patent No.: US 11,082,995 B2
(45) Date of Patent: Aug. 3, 2021

(54) DATA TRANSMISSION METHOD, NETWORK SIDE DEVICE AND TERMINAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 201 days.

(21) Appl. No.: 16/461,782

(22) PCT Filed: Apr. 21, 2017

(86) PCT No.: PCT/CN2017/081469
§ 371 (c)(1),
(2) Date: May 16, 2019

(87) PCT Pub. No.: WO2018/191962
PCT Pub. Date: Oct. 25, 2018

(65) Prior Publication Data
US 2019/0320449 A1    Oct. 17, 2019

(51) Int. Cl.
*H04W 72/12* (2009.01)
*H04W 72/14* (2009.01)

(52) U.S. Cl.
CPC ... *H04W 72/1257* (2013.01); *H04W 72/1268* (2013.01); *H04W 72/14* (2013.01)

(58) Field of Classification Search
CPC .......................... H04W 72/14; H04W 72/1257
See application file for complete search history.

(56) References Cited

U.S. PATENT DOCUMENTS

| | | | | |
|---|---|---|---|---|
| 2004/0204099 | A1* | 10/2004 | Dam | H04B 7/0408 455/561 |
| 2012/0307780 | A1* | 12/2012 | Mochizuki | H04W 28/0236 370/329 |
| 2014/0247799 | A1 | 9/2014 | Suzuki et al. | |

(Continued)

FOREIGN PATENT DOCUMENTS

| CN | 102083223 | 6/2011 |
|---|---|---|
| CN | 104396296 | 3/2015 |

(Continued)

OTHER PUBLICATIONS

CNIPA, Notification to Grant Patent Right for Invention for CN Application No. 201780072148.8, dated Mar. 3, 2020.
(Continued)

*Primary Examiner* — Angel T Brockman
(74) *Attorney, Agent, or Firm* — Hodgson Russ LLP

(57) ABSTRACT

Disclosed are a data transmission method, a network side device and a terminal. The method includes: reusing, by a terminal, a first resource to transmit first data, wherein the first data is data of a first service, the first resource is a resource in a second resource for transmitting second data, the second data is initial transmission data of a second service, a latency requirement of the first service is higher than a latency requirement of the second service; and retransmitting, by the terminal, third data on a third resource, wherein the third data is all or part of the second data.

16 Claims, 6 Drawing Sheets

(56) References Cited

U.S. PATENT DOCUMENTS

| | | | | |
|---|---|---|---|---|
| 2015/0245376 | A1* | 8/2015 | Bashar | H04L 1/18 370/277 |
| 2016/0204924 | A1* | 7/2016 | Li | H04L 5/0053 370/280 |
| 2016/0352551 | A1 | 12/2016 | Zhang et al. | |
| 2017/0026992 | A1* | 1/2017 | Jiang | H04W 72/1263 |

FOREIGN PATENT DOCUMENTS

| | | |
|---|---|---|
| CN | 106413105 | 2/2017 |
| CN | 106488563 | 3/2017 |
| CN | 106538019 | 3/2017 |
| WO | 2016192644 | 12/2016 |
| WO | 2018142201 | 8/2018 |

OTHER PUBLICATIONS

Ericsson, "Summary of RAN2 Solutions for URLLC", 3GPP TSG-RAN WG2 #97, Feb. 13, 2017.

ZTE, "Consideration on DRX", 3GPP TSG-RAN WG2 Meeting#99bis, Oct. 9, 2017.

Fujitsu, "DL control channel related to multiplexing eMBB and URLLC," 3GPP TSG RAN WG1 Meeting #86bis R1-1608814, Oct. 2016, 4 pages.

WIPO, ISR for PCT/CN2017/081469, Jan. 19, 2018.

Ericsson, "On Intra-UE UL Puncturing," 3GPP TSG-RAN WG1 #88bis, R1-1706056, Apr. 2017, 2 pages.

Ericsson, "On eMBB/URLLC multiplexing for uplink," 3GPP TSG-RAN WG1 #88, R1-1701870, Feb. 2017, 2 pages.

Ericsson, "DL HARQ considerations for URLLC and punctured eMBB," 3GPP TSG-RAN WG2 Meeting#97bis, Tdoc R2-1702664, Apr. 2017, 4 pages.

Huawei et al., "On DL multiplexing of URLLC and eMBB transmissions," 3GPP TSG RAN WG1 Adhoc Meeting, R1-1700022, Jan. 2017, 12 pages.

NTT Docomo, Inc., "On multiplexing of eMBB and URLLC in downlink," 3GPP TSG RAN WG1 AH_NR Meeting, R1-1700626, Jan. 2017, 7 pages.

CNIPA, First Office Action for CN Application No. 201780072148. 8, dated Nov. 27, 2019.

EPO, Office Action for EP Application No. 17906332.6, dated Nov. 6, 2019.

* cited by examiner

DATA TRANSMISSION METHOD, NETWORK SIDE DEVICE AND TERMINAL

CROSS-REFERENCE TO RELATED APPLICATION

This application is a U.S. national phase application of International Application No. PCT/CN2017/081469, filed Apr. 21, 2017, the entire disclosure of which is incorporated herein by reference.

TECHNICAL FIELD

The present disclosure relates to communications technologies, and in particular, to a data transmission method, a network side device, and a terminal.

BACKGROUND

The fifth-generation mobile communication technology (5th-Generation, 5G) that is, new radio (NR), is a newly proposed topic in the third generation partnership project (3GPP) organization. As discussion of the new generation of 5G technology gradually deepens, on the one hand, since a communication system is backward compatibility, a new technology developed later tends to be compatible with a previously standardized technology; on the other hand, since the fourth generation mobile communication technology (4G), that is, long-term evolution technology (LTE) has a large number of existing designs, if compatibility is needed to be achieved, a lot of flexibility of 5G have to be sacrificed, thereby reducing performance. Therefore, there are currently two parallel studies in the 3GPP organization, wherein a technical discussion group without considering the backward compatibility is called 5G NR.

At present, in a transmission strategy, that is, enhanced mobile broadband (eMBB) and ultra-reliable & low latency communication (URLLC) reusing (puncturing), discussed in the NR RAN1, the 3GPP organization has agreed that the sharing/puncturing transmission of the URLLC can be performed on the eMBB resource being transmitted. The NR needs to support URLLC service, which has extremely high requirements for latency and reliability, and also support eMBB services at the same time, which has high requirements for transmission rate. There are two considerations as follows for a mode of resource reusing of URLLC and eMBB.

As shown in FIG. 1, a first reusing mode is a semi-static reusing of URLLC service scheduling resource and eMBB service scheduling resource. In this mode, the URLLC service and the eMBB service are transmitted on different frequency resources, and the frequency resource of the URLLC service is semi-statically configured by a network. In a time domain, the URLLC service may be in a time granularity of mini-slots or a time granularity of normal slots. The eMBB uses the time granularity of normal slots. On the frequency resource configured semi-statically, the URLLC service does not interfere with the eMBB service. However, since the frequency resource is configured semi-statically, generally there is a problem of low resource utilization with consideration of suddenness of the URLLC service, that is, the frequency resource for the URLLC configured semi-statically will not be fully utilized, resulting a waste of the resource.

As shown in FIG. 2, a second reusing mode is a dynamic reusing of the URLLC service scheduling resource and the eMBB service scheduling resource. In this manner, the additional frequency resource is not required to be configured semi-statically for the URLLC service, that is, the URLLC service can be multiplexed with the eMBB service in the same frequency band. In terms of the time granularity, the time granularity of the mini-slots is generally used due to the low latency requirement of the URLLC service, for example, a length of two orthogonal frequency division reusing (OFDM) symbols. For the eMBB service, the normal slot is generally used, for example, a length of 14 OFDM symbols.

In the semi-static reusing mode of the above two reusing modes, the URLLC service and the eMBB service do not interfere with each other, so no additional optimization strategy is required to operate. For the dynamic reusing mode, there are some problems. In the current discussion in the NR RAN1, this reusing mode has been agreed, that is, it is considered to multiplex the burst URLLC service to the eMBB resource being transmitted in a "puncturing" manner, which will inevitably affect the eMBB service being transmitted/received.

Generally, for the dynamic reusing of the URLLC service and the eMBB service, there are two scenarios. A first scenario is dynamic reusing of the URLLC service scheduling resource and the eMBB service scheduling resource of the same terminal, that is, the URLLC service of a terminal 1 is punctured onto the eMBB service scheduling resource of the terminal 1. A second scenario is dynamic reusing of the URLLC service scheduling resource and the eMBB service scheduling resource of different terminals, that is, the URLLC service of a terminal 2 is punctured onto the eMBB service scheduling resource of the terminal 1.

For the first scenario of dynamic reusing, since the URLLC service is dynamically multiplexed onto the eMBB service scheduling resource, receiving performance of a transport block (TB) on the punctured eMBB service scheduling resource is to be affected. If there is a receiving error, it is required that the network re-schedules the retransmission of the entire eMBB service for the uplink, which has a relatively great impact on the transmission of the eMBB service. The impact can be shown in FIG. 3. A terminal sends eMBB service data on the scheduling resource of a gNB (a name of a 5G base station), burst URLLC service data is punctured to the transmission resource of the eMBB service data. For example, URLLC data of a mini-slot is punctured to eMBB resource of a slot. After demodulating the eMBB data, the gNB finds a demodulation error. In the next slot, the eMBB service scheduling resource is re-allocated to the terminal, and then the terminal retransmits the eMBB service data failing to be received on the newly allocated service scheduling resource. The above entire process is a traditional failed scheduling process. However, in the scenario of the puncturing, it is possible that the gNB knows in advance that receiving of the corresponding punctured eMBB service data may be failed.

SUMMARY

Embodiments of the present disclosure provide a data transmission method, a network side device, and a terminal, so as to improve data transmission efficiency for transmitting second data on which first data is punctured.

In a first aspect, an embodiment of the present disclosure provides a data transmission method, including:

reusing, by a terminal, a first resource to transmit first data, wherein the first data is data of a first service, the first resource is a resource in a second resource for transmitting second data, the second data is initial transmission data of a second service, a latency requirement of the first service is higher than a latency requirement of the second service; and retransmitting, by the terminal, third data on a third resource, wherein the third data is all or part of the second data.

As can be seen from the embodiment of the present disclosure, since the third data is all or part of the second data, the third data may include data on the first resource affected by the puncturing transmission of the first data, so that a network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is error in demodulating of the data of the second service, which saves the processing time for waiting for the network side device to re-initiate the scheduling and is beneficial to improve the transmission efficiency for transmitting the second data for transmitting the first data by puncturing.

In a possible design, before the terminal reuses the first resource to transmit the first data, the method further includes:

receiving, by the terminal, a downlink control signaling (DCI), wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

In the present design, the second resource and the third resource of the terminal may be pre-configured by the network side device. Specifically, the network side device may dynamically determine whether the second resource needs to be configured to be the resource reusable by the first service according to the service requirement, and if the second resource needs to be configured to be the resource reusable by the first service, the additional third resource are configured simultaneously. The third resource is configured to be a resource for the terminal to schedule data by the terminal itself. The terminal can easily obtain configuration information through DCI and adjust the data scheduling resources in real time without taking longer time to complete resource scheduling based on complex strategies such as resource balancing by itself, thereby improving the response efficiency and real-time performance of the resource scheduling of the terminal.

In a possible design, the terminal reusing the first resource to transmit the first data includes:

transmitting, by the terminal, a scheduling request for the first data;

receiving, by the terminal, a scheduling response to the scheduling request, and reusing the first resource to transmit the first data according to the scheduling response; or reusing, by the terminal, the first resource to transmit the first data according to a preset grant-free strategy.

In the present design, the terminal can dynamically acquire the scheduling resource for the first data indicated by the network side device by the scheduling request, which is beneficial to improve the flexibility of resource adjustment of the high-latency service data. The terminal may also directly reuse the first resource to transmit the first data according to the scheduling-free strategy, which is beneficial to improve the real-time performance of resource adjustment of the high-latency service data.

In a possible design, the third data is data of the second service transmitted on the first resource.

In the present design, since the third data is the data of the second service transmitted on the first resource, that is, the terminal transmits only the part of the data affected by the puncturing transmission of the first data on the third resource without adding any additional data, thereby improving the data transmission efficiency while ensuring that the network side device can correctly receive the second data as far as possible.

In a possible design, before the terminal retransmits the third data on the third resource, the method further includes:

receiving, by the terminal, configuration information for a location of the first data;

determining, by the terminal, the third data according to the configuration information for the location of the first data; or determining, by the terminal, the third data according to resource location of the first data and a preset corresponding relationship between a coded block CB of the second data and a resource unit RE.

In the present design, the terminal can determine the third data according to the configuration information for the location of the first data, and the configuration information can be dynamically assigned by the network side device, which is beneficial to improve the flexibility in the adjustment of the third data. The terminal may also quickly determine the third data by itself according to the resource location of the first data and the corresponding relationship between the coded block CB of the second data and the resource unit RE, which is beneficial to improve the real-time performance of the determination of the third data.

In a possible design, a parameter of a hybrid automatic repeat request HARQ transmitted on the second resource is the same as a parameter of a HARQ transmitted on the third resource.

In a second aspect, an embodiment of the present disclosure provides a data transmission method, including:

receiving, by a network side device, first data on a first resource, wherein the first data is data of a first service, the first resource is a resource in a second resource for transmitting second data, the second data is initial transmission data of a second service, a latency requirement of the first service is higher than a latency requirement of the second service; and receiving, by the network side device, third data on a third resource, wherein the third data is all or part of the second data.

As can be seen from the embodiment of the present disclosure, since the third data is all or part of the second data, the third data may include data on the first resource affected by the puncturing transmission of the first data, so that a network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is an error in demodulating of the data of the second service, which saves the processing time for waiting for the network side device to re-initiate the scheduling and is beneficial to improve the transmission efficiency for transmitting the second data for transmitting the first data by puncturing.

In a possible design, before the network side device receives the first data on the first resource, the method further includes:

sending, by the network side device, a downlink control signaling DCI, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for a terminal to self-schedule data.

In a possible design, the network side device receiving first data on a first resource includes:

receiving, by the network side device, a scheduling request for the first data;

sending, by the network side device, a scheduling response to the scheduling request, wherein the scheduling response is configured to indicate a terminal to reuse the first resource to send the first data; and receiving, by the network side device, the first data on the first resource.

In a possible design, the third data is data of the second service transmitted on the first resource.

In a possible design, before the network side device receives the third data on the third resource, the method further includes:

sending, by the network side device, configuration information for a location of the first data, wherein the configuration information for the location of the first data is configured to determine the third data by the terminal.

In a possible design, a parameter of a hybrid automatic repeat request HARQ transmitted on the second resource is the same as the parameter of the HARQ transmitted on the third resource.

In a possible design, after the network side device receives the third data on the third resource, the method further includes:

performing, by the network side device, a bundling feedback operation on the third data and a fourth data, wherein the fourth data is data of the second service received by the network side device on the second resource.

In a third aspect, an embodiment of the present disclosure provides a terminal, including one or more processors, a memory, and one or more programs, wherein the one or more programs are stored in the memory and configured to be executed by the one or more processors, the program includes instructions for performing the following steps:

reusing a first resource to transmit first data, wherein the first data is data of a first service, the first resource is a resource in a second resource transmitting second data, the second data is initial transmission data of a second service, and a latency requirement of the first service is higher than a latency requirement of the second service; and retransmitting third data on a third resource, wherein the third data is all or part of the second data.

In a possible design, the program also includes instructions for performing the following steps:

receiving a downlink control signaling (DCI) before reusing the first resource to transmit the first data, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

In a possible design, in terms of the reusing a first resource to transmit first data, the instructions in the program are specifically configured to perform the following steps:

transmitting a scheduling request for the first data;

receiving a scheduling response to the scheduling request, and reusing the first resource to transmit the first data according to the scheduling response; or reusing the first resource to transmit the first data according to a preset grant-free strategy.

In a possible design, the third data is data of the second service transmitted on the first resource.

In a possible design, the program also includes instructions for performing the following steps:

receiving configuration information for a location of the first data before retransmitting the third data on the third resource; and determining the third data according to the configuration information for the location of the first data; or determining the third data according to resource location of the first data and a preset corresponding relationship between a coded block CB of the second data and a resource unit RE before retransmitting the third data on the third resource.

In a possible design, a parameter of a hybrid automatic repeat request HARQ transmitted on the second resource is the same as the parameter of the HARQ transmitted on the third resource.

In a fourth aspect, an embodiment of the present disclosure provides a network side device, including one or more processors, a memory, and one or more programs, wherein the one or more programs are stored in the memory, and configured to be executed by the one or more processors, the program includes instructions for performing the following steps:

receiving first data on a first resource, wherein the first data is data of a first service, the first resource is a resource in a second resource for transmitting second data, the second data is initial transmission data of a second service, a latency requirement of the first service is higher than a latency requirement of the second service; and receiving third data on a third resource, wherein the third data is all or part of the second data.

In a possible design, the program also includes instructions for performing the following steps:

sending a downlink control signaling DCI before receiving the first data on the first resource, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

In a possible design, in terms of the receiving first data on a first resource, the instructions in the program are specifically configured to perform the following steps:

receiving a scheduling request for the first data;

sending a scheduling response to the scheduling request, wherein the scheduling response is configured to indicate a terminal to reuse the first resource to send the first data; and receiving the first data on the first resource.

In a possible design, the third data is data of the second service transmitted on the first resource.

In a possible design, the program also includes instructions for performing the following steps:

receiving configuration information for a location of the first data before retransmitting the third data on the third resource; determining the third data according to the configuration information for the location of the first data; or determining the third data according to resource location of the first data and a preset corresponding relationship between a coded block CB of the second data and a resource unit RE before retransmitting the third data on the third resource.

In a possible design, a parameter of a hybrid automatic repeat request HARQ transmitted on the second resource is the same as the parameter of the HARQ transmitted on the third resource.

In a fifth aspect, an embodiment of the present disclosure provides a terminal, wherein the terminal has a function of implementing a behavior of a terminal in the foregoing design of the method. The function may be implemented by hardware or by corresponding software implemented by hardware. The hardware or software includes one or more modules corresponding to the above functions.

In a sixth aspect, an embodiment of the present disclosure provides a network side device, wherein the network side device has a function of implementing behavior of a network side device in the foregoing design of the method. The function may be implemented by hardware or by corresponding software implemented by hardware. The hardware or software includes one or more modules corresponding to the above functions.

In a seventh aspect, an embodiment of the present disclosure provides a computer readable storage medium, wherein the computer readable storage medium stores a computer program for electronic data exchange, wherein the computer program causes a computer to perform some or all of the steps as described in any of the methods in the first aspect of the embodiments of the present disclosure.

In an eighth aspect, an embodiment of the present disclosure provides a computer readable storage medium, wherein the computer readable storage medium stores a computer program for electronic data exchange, wherein the computer program causes a computer to perform some or all of the steps as described in any of the methods in the second aspect of the embodiments of the present disclosure.

In a ninth aspect, an embodiment of the present disclosure provides a computer program product, wherein the computer program product includes a non-transitory computer readable storage medium storing a computer program, the computer program being operative to cause a computer to perform some or all of the steps as described in any of the methods in the first aspect of the embodiments of the present disclosure. The computer program product can be a software installation package.

In a tenth aspect, an embodiment of the present disclosure provides a computer program product, wherein the computer program product includes a non-transitory computer readable storage medium storing a computer program, the computer program being operative to cause a computer to perform some or all of the steps as described in any of the methods in the first aspect of the embodiments of the present disclosure. The computer program product can be a software installation package.

As can be seen from the embodiments of the present disclosure, since the third data is all or part of the second data, the third data can include data on the first resource affected by the puncturing transmission of the first data, so that a network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is an error in demodulating of the data of the second service, which saves the processing time for waiting for the network side device to re-initiate the scheduling and is beneficial to improve the transmission efficiency for transmitting the second data for transmitting the first data by puncturing.

BRIEF DESCRIPTION OF THE DRAWINGS

The drawings used in the embodiments or the description of the prior art will be briefly described below.

DETAILED DESCRIPTION

The technical solutions in the embodiments of the present disclosure will be described below with reference to the drawings.

Figure 1:
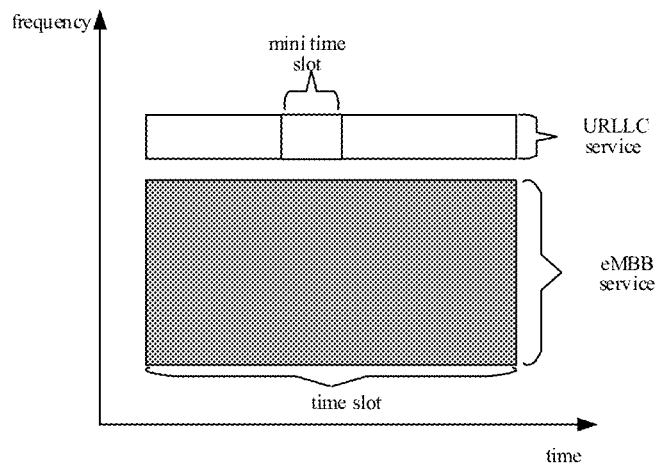
FIG. 1 is a schematic diagram of semi-static reusing of scheduling resource in an existing LTE communication system.
Figure 2:
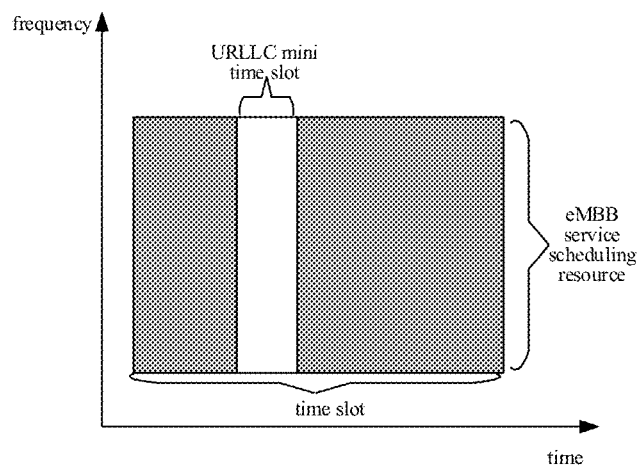
FIG. 2 is a schematic diagram of dynamic reusing of scheduling resources in an existing LTE communication system.
Figure 3:
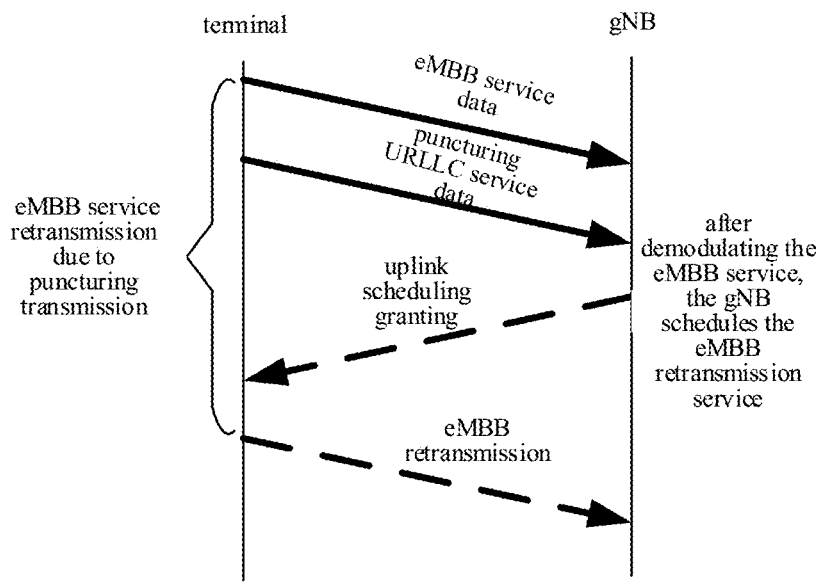
FIG. 3 is a schematic flowchart of rescheduling data commonly used in an existing communication system.
Figure 4:
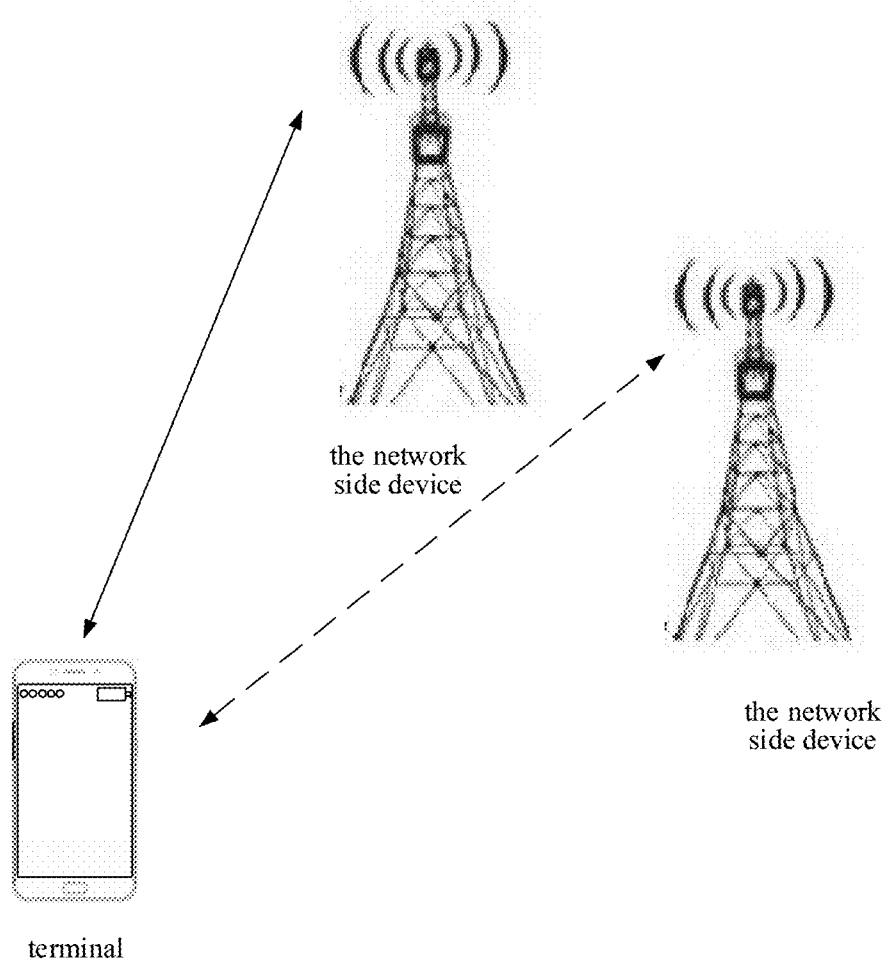
FIG. 4 is a network architecture diagram of an exemplary communication system provided by an embodiment of the present disclosure.

Referring to FIG. 4, FIG. 4 is a possible network architecture of an exemplary communication system provided by an embodiment of the present disclosure. The exemplary communication system may be a 4G LTE communication system or a 5G NR communication system, specifically including a network side device and a terminal. When the terminal accesses a mobile communication network provided by the network side device, communication connection between the terminal and the network side device can be radio link, and the communication connection mode may be a single connection mode, a dual connection mode or a multiple connection mode. When the communication connection mode is the single connection mode, the network side device may be an LTE base station or an NR base station (also referred to as gNB base station); when the communication mode is the dual connection mode (specifically, implemented by carrier aggregation CA technology, or multiple network side devices) and the terminal is connected to multiple network side devices, the multiple network side devices may be a primary base station MCG and a secondary base station SCG, and data backhaul between base stations is performed via backhaul link. The primary base station may be a LTE base station, and the secondary base station may be a LTE base station; or the primary base station may be an NR base station, and the secondary base station may be an LTE base station; or the primary base station may be an NR base station, and the secondary base station may be NR base station. In the embodiments of the present disclosure, the terms "network" and "system" are often used interchangeably, and those skilled in the art can understand the meaning thereof. The terminal involved in the embodiments of the present disclosure may include various devices having a function of wireless communication, such as hand-held devices, in-vehicle devices, wearable devices, computing devices, or other processing devices connected to the wireless modem, and various forms of user equipment (UE), mobile station (MS), terminal device, and the like. For convenience of description, the devices mentioned above are collectively referred to as terminals.

Figure 5A:
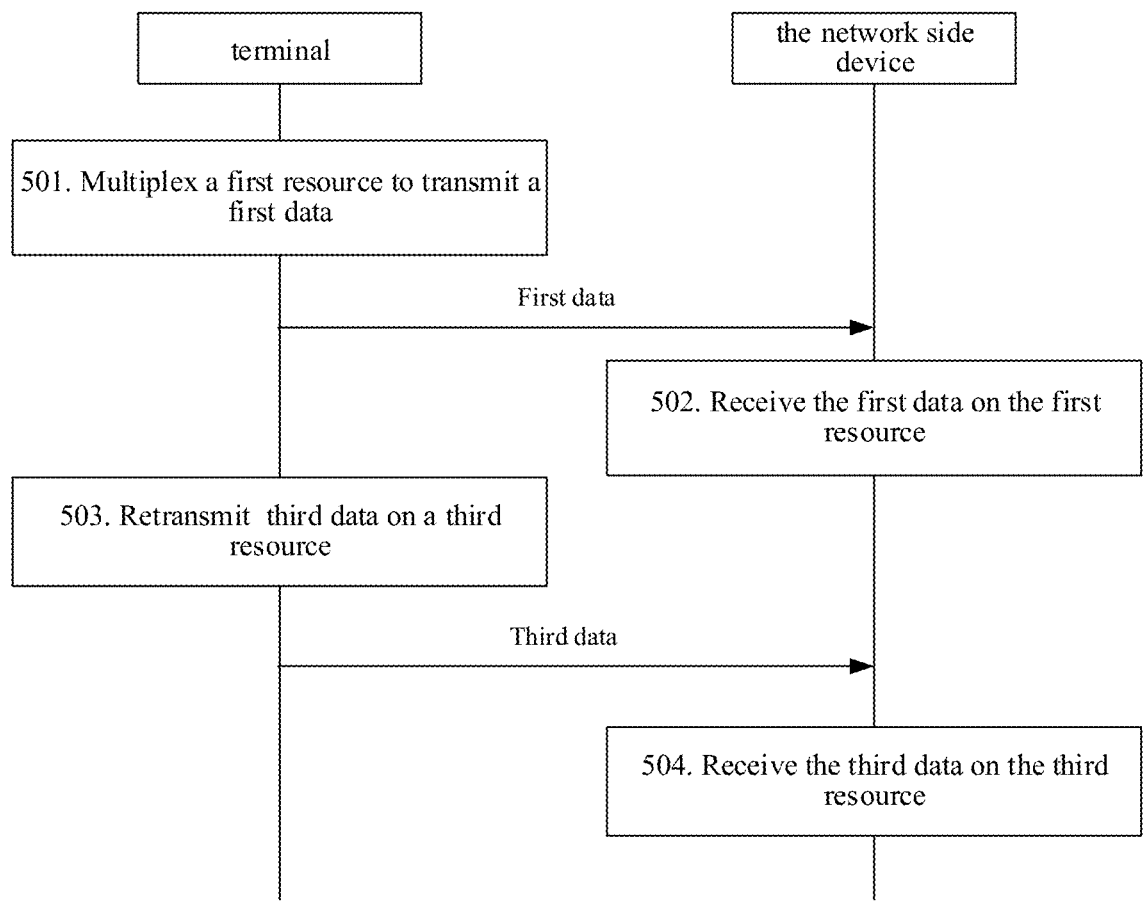
FIG. 5A is a schematic diagram of a data transmission method provided by an embodiment of the present disclosure.

FIG. 5A is a data transmission method provided by an embodiment of the present disclosure. The method includes a part 501, which is described as follows:

In a part 501, a terminal reuses (multiplexes) a first resource to transmit first data, wherein the first data is data of a first service, the first resource is a resource in a second resource for transmitting second data, the second data is initial transmission data of a second service, and a latency requirement of the first service is higher than a latency requirement of the second service.

The first service may be an ultra-reliable & low latency communication URLLC service in a 5G scenario, and the second service may be an enhanced mobile broadband eMBB service in the 5G scenario.

In a part 502, a network side device receives the first data on the first resource, wherein the first data is data of a first service, the first resource is a resource in a second resource for transmitting second data, the second data is initial transmission data of a second service, and a latency requirement of the first service is higher than a latency requirement of the second service.

In a part 503, the terminal retransmits third data on a third resource, wherein the third data is all or part of the second data.

The third data is the affected data in the initial transmission data of the second service, and the term "affected" refers to being affected by the puncture transmission of the first data.

In a part 504, the network side device receives the third data on the third resource, wherein the third data is all or part of the second data.

As can be seen from the embodiment of the present disclosure, since the third data is all or part of the second data, the third data may include data on the first resource which is affected by the puncturing transmission of the first data, so that a network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is an error in demodulating of the data of the second service, which saves the processing time for waiting for the network side device to re-initiate the scheduling and is beneficial to improve the transmission efficiency of the second data for transmitting the first data by puncturing.

In a possible example, before the terminal reuses a first resource to transmit first data, the method further includes:

receiving, by the terminal, a downlink control signaling (DCI), wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

Figure 5B:
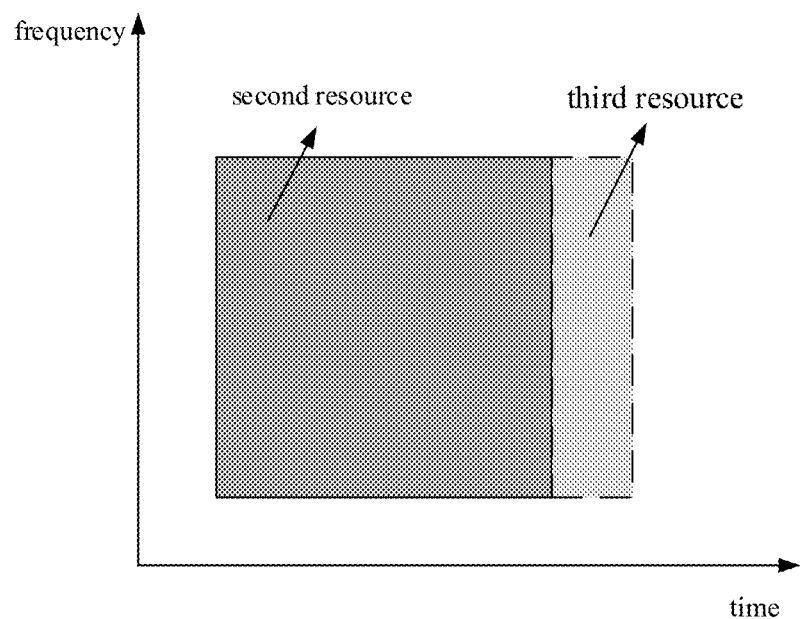
FIG. 5B is a schematic diagram of allocation of a second resource and a third resource provided by an embodiment of the present disclosure.

For example, a schematic diagram of the allocation of the second resource and the third resource is shown in FIG. 5B. The second resource and the third resource are in close proximity in the time domain, that is, the terminal sends the second data and the third data without gaps or intervals.

Figure 5C:
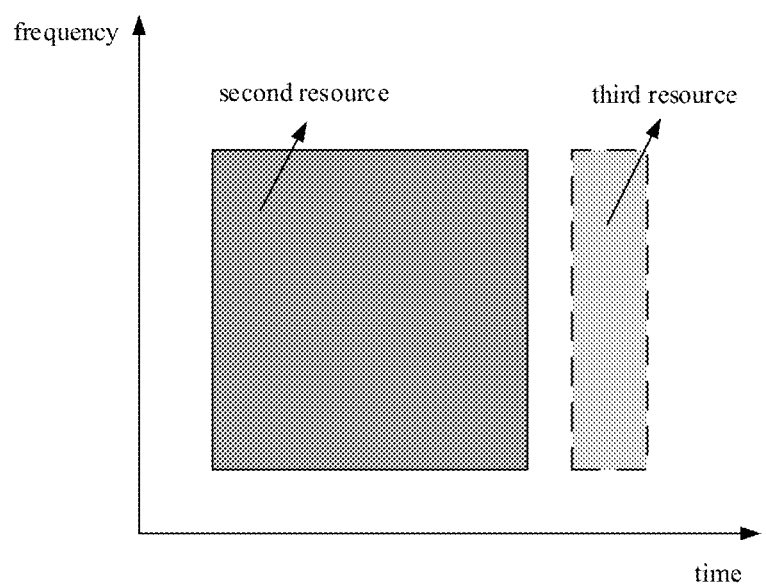
FIG. 5C is a schematic diagram of another allocation of a second resource and a third resource provided by an embodiment of the present disclosure.

For another example, another schematic diagram of the allocation of the second resource and the third resource is shown in FIG. 5C. The interval between the second resource and the third resource in the time domain is a preset duration, and the preset duration can be, for example, the processing duration of the third data determined by the terminal, which is beneficial to improve the stability of transmitting the data by the terminal.

Correspondingly, in the present example, before the network side device receives the first data on the first resource, the method further includes:

sending, by the network side device, a downlink control signaling DCI, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for a terminal to self-schedule data.

In the case that the puncturing transmission of the first data is not performed on the second data by the terminal, the third resource may be used to transmit new data by the terminal. This can be beneficial for improving the resource utilization efficiency of the terminal.

In the present example, the second resource and the third resource of the terminal may be pre-configured by the network side device. Specifically, the network side device may dynamically determine whether the second resource needs to be configured to be a resource reusable by the first service according to the service requirement; if it is determined that the second resource needs to be configured to be a resource reusable by the first service, the additional third resource are configured simultaneously. The third resource is configured to be a resource for the terminal to self-schedule data. The terminal can easily obtain configuration information through DCI and adjust the data scheduling resources in real time without taking relatively long time to complete resource scheduling based on complex strategies such as resource balancing by itself, thereby improving the response efficiency and real-time performance of the resource scheduling of the terminal.

In a possible example, the terminal reusing the first resource to transmit the first data includes:

transmitting, by the terminal, a scheduling request for the first data;

receiving, by the terminal, a scheduling response to the scheduling request, and reusing the first resource to transmit the first data according to the scheduling response; or reusing, by the terminal, the first resource to transmit the first data according to a preset grant-free strategy.

In the present example, the terminal can dynamically acquire the scheduling resource of the first data indicated by the network side device by the scheduling request, which is beneficial to improve the flexibility of resource adjustment of the high-latency service data. The terminal may also directly reuse the first resource to transmit the first data according to the scheduling-free strategy, which is beneficial to improve the real-time performance of resource adjustment of the high-latency service data.

Correspondingly, in the present example, the network side device receiving the first data on the first resource includes:

receiving, by the network side device, a scheduling request for the first data;

sending, by the network side device, a scheduling response to the scheduling request, wherein the scheduling response is configured to indicate a terminal to reuse the first resource to send the first data; and receiving, by the network side device, the first data on the first resource.

In a possible example, the third data is data of the second service transmitted on the first resource.

In the present example, since the third data is the data of the second service transmitted on the first resource, that is, the terminal transmits only the part of the data affected by the puncturing transmission of the first data on the third resource without adding any additional data, thereby improving the data transmission efficiency and resource utilization efficiency while ensuring that the network side device can correctly receive the second data as far as possible.

In a possible example, before the terminal retransmits the third data on the third resource, the method further includes:

receiving, by the terminal, configuration information for a location of the first data;

determining, by the terminal, the third data according to the configuration information for the location of the first data; or determining, by the terminal, the third data according to resource location of the first data and a preset corresponding relationship between a coded block CB of the second data and a resource unit RE.

Determining, by the terminal, the third data according to resource location of the first data and a preset corresponding relationship between a coded block CB of the second data and a resource unit RE may be specifically implemented as follows:

The terminal determines the affected resource unit according to the resource location of the first data, then determines the affected coded block according to the corresponding relationship between a coded block CB of the second data and the resource unit, and finally determines the affected data as the third data according to the affected coding block.

In the present example, the terminal can determine the third data according to the configuration information for the location of the first data, and the configuration information can be dynamically assigned by the network side device, which is beneficial to improve the flexibility of the adjustment of the third data. The terminal may also quickly determine the third data by itself according to the resource location of the first data and the corresponding relationship between the coded block of the second data and the resource unit, which is beneficial to improve the real-time performance of the adjustment of the third data.

Correspondingly, in the present example, before the network side device receives the third data on the third resource, the method further includes:

sending, by the network side device, configuration information for a location of the first data, wherein the configuration information for the location of the first data is configured to determine the third data by the terminal.

In a possible example, a parameter of a HARQ transmitted on the second resource is the same as the parameter of the HARQ transmitted on the third resource.

The parameter of the HARQ includes a HARQ process ID, a modulation and coding scheme (MCS) used for transmission, and the like.

In a possible example, after the network side device receives the third data on the third resource, the method further includes:

performing, by the network side device, a bundling feedback operation on the third data and a fourth data, wherein the fourth data is data of the second service received by the network side device on the second resource.

In the present example, the network side device may perform the bundling feedback operation after receiving the third data and the fourth data, so that the network side device does not separately generate a HARQ feedback for the fourth data on the MAC layer, but waits for completing the receiving of the affected data in the initial transmission data of the second service (the affected data in the initial transmission data is the third data) on the additional second resource, and after this, the HARQ feedback is generated, which is beneficial to improve the data processing efficiency and real-time performance of the initial transmission data of the second service.

Figure 6A:
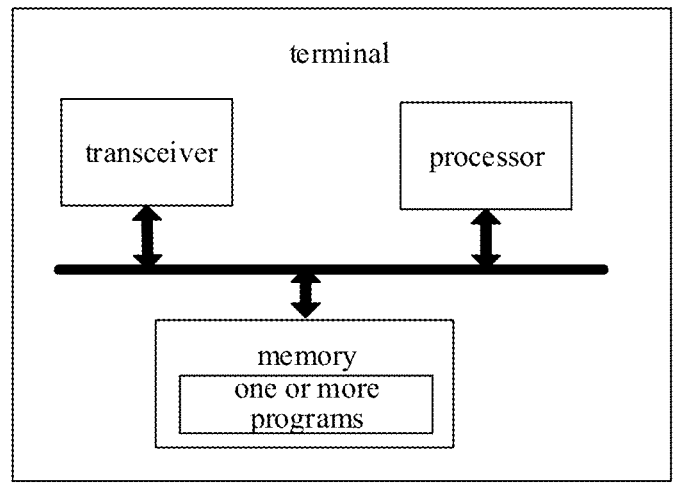
FIG. 6A is a schematic structural diagram of a terminal provided by an embodiment of the present disclosure.

Being consistent with the above embodiment shown in FIG. 5, FIG. 6A is a schematic structural diagram of a terminal provided by an embodiment of the present disclosure. As shown in the figure, the terminal includes one or more processors, a memory, a transceiver and one or more programs, wherein the one or more programs are stored in the memory and configured to be executed by the one or more processors, and the program include instructions for performing the following steps:

reusing a first resource to transmit first data, wherein the first data is data of a first service, the first resource is a resource in a second resource transmitting second data, the second data is initial transmission data of a second service, and a latency requirement of the first service is higher than a latency requirement of the second service; and retransmitting third data on a third resource, wherein the third data is all or part of the second data.

As can be seen from the embodiment of the present disclosure, since the third data is all or part of the second data, the third data may include data on the first resource affected by the puncturing transmission of the first data, so that a network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is an error in demodulating of the data of the second service, which saves the processing time for waiting for the network side device to re-initiate the scheduling and is beneficial to improve the transmission efficiency of the second data transmitting the first data by puncturing.

In a possible example, the programs further include instructions for performing the following steps:

receiving a downlink control signaling (DCI) before reusing the first resource to transmit the first data, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

In the present design, the second resource and the third resource of the terminal may be pre-configured by the network side device. Specifically, the network side device may dynamically determine whether the second resource needs to be configured to be the resource reusable by the first service according to the service requirement; if it is determined that the second resource needs to be configured to be the resource reusable by the first service, the additional third resource are configured simultaneously. The third resource is configured to be a resource for the terminal to self-schedule data. The terminal can easily obtain configuration information through DCI and adjust the data scheduling resources in real time without taking relatively long time to complete resource scheduling based on complex strategies such as resource balancing by itself, thereby improving the response efficiency and real-time performance of the resource scheduling of the terminal In a possible example, in terms of the reusing a first resource to transmit first data, instructions in the programs are specifically configured to perform the following steps:

transmitting a scheduling request for the first data;

receiving a scheduling response to the scheduling request, and reusing the first resource to transmit the first data according to the scheduling response; or reusing the first resource to transmit the first data according to a preset grant-free strategy.

In the present example, the terminal can dynamically acquire the scheduling resource of the first data indicated by the network side device by the scheduling request, which is beneficial to improve the flexibility of resource adjustment of the high-latency service data. The terminal may also directly reuse the first resource to transmit the first data according to the scheduling-free strategy, which is beneficial to improve the real-time performance of resource adjustment of the high-latency service data.

In a possible example, the third data is data of the second service transmitted on the first resource.

In the present design, since the third data is the data of the second service transmitted on the first resource, that is, the terminal transmits only the part of the data affected by the puncturing transmission of the first data on the third resource without adding any additional data, thereby improving the data transmission efficiency while ensuring that the network side device can correctly receive the second data as far as possible.

In a possible example, the programs further include instructions for performing the following steps:

receiving configuration information for a location of the first data before retransmitting the third data on the third resource; and determining the third data according to the configuration information for the location of the first data; or determining the third data according to resource location of the first data and a preset corresponding relationship between a coded block CB of the second data and a resource unit RE before retransmitting the third data on the third resource.

In the present example, the terminal can determine the third data according to the configuration information for the location of the first data, and the configuration information can be dynamically assigned by the network side device, which is beneficial to improve the flexibility of the adjustment of the third data. The terminal may also quickly determine the third data by itself according to the resource location of the first data and the corresponding relationship between the coded block of the second data and the resource unit, which is beneficial to improve the real-time performance of the adjustment of the third data.

In a possible example, a parameter of a hybrid automatic repeat request HARQ transmitted on the second resource is the same as the parameter of the HARQ transmitted on the third resource.

Figure 6B:
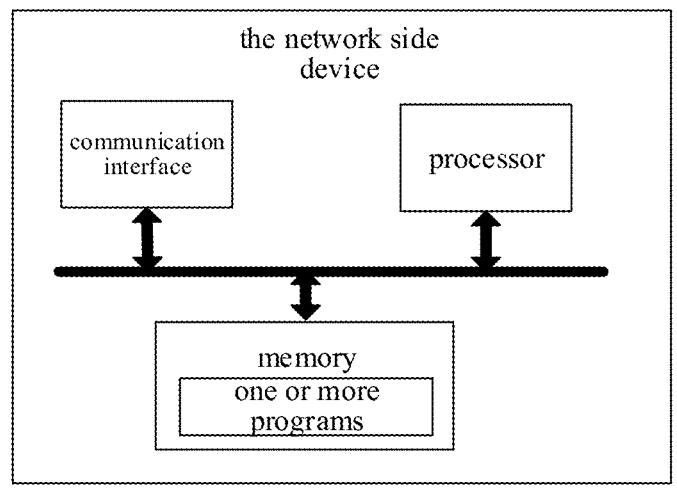
FIG. 6B is a schematic structural diagram of a network side device provided by an embodiment of the present disclosure.

Being consistent with the above embodiment shown in FIG. 5, FIG. 6B is a schematic structural diagram of a network side device provided by an embodiment of the present disclosure. As shown in the figure, the network side device includes one or more processors, a memory, a communication interface and one or more programs, wherein the one or more programs are stored in the memory and configured to be executed by the one or more processors, and the program include instructions for performing the following steps:

receiving first data on a first resource, wherein the first data is data of a first service, the first resource is a resource in a second resource for transmitting second data, the second data is initial transmission data of a second service, a latency requirement of the first service is higher than a latency requirement of the second service; and receiving third data on a third resource, wherein the third data is all or part of the second data.

In the embodiment of the present disclosure, since the third data is all or part of the second data, the third data may include data on the first resource affected by the puncturing transmission of the first data, so that the network side device may correctly receive the second data. In addition, after the terminal uses the resource scheduled for the service with low latency requirement to perform the puncturing transmission of the data of the service with high latency requirement, the terminal directly uses the third resource to transmit the third data, without waiting for the network side device to re-initiate the scheduling of the second data after there is an error in demodulating of the data of the second service, which saves the processing time for waiting for the network side device to re-initiate the scheduling and is beneficial to improve the transmission efficiency of the second data transmitting the first data by puncturing.

In a possible example, the program further include instructions for performing the following steps:

sending a downlink control signaling DCI before receiving the first data on the first resource, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

In the present example, the second resource and the third resource of the terminal may be pre-configured by the network side device. Specifically, the network side device may dynamically determine whether the second resource needs to be configured to be the resource reusable by the first service according to the service requirement; if it is determined that the second resource needs to be configured to be the resource reusable by the first service, the additional third resource are configured simultaneously. The third resource is configured to be a resource for the terminal to self-schedule data. The network side device indicates the configuration information for the terminal through DCI and flexibly adjusts the scheduling resource of the data in real time without taking relatively long time to complete resource scheduling based on complex strategies such as resource balancing by itself, thereby improving the efficiency and real-time performance of the resource scheduling.

In a possible example, in terms of the receiving first data on a first resource, instructions in the programs are specifically configured to perform the following steps:

receiving a scheduling request for the first data;

sending a scheduling response to the scheduling request, wherein the scheduling response is configured to indicate a terminal to reuse the first resource to send the first data; and receiving the first data on the first resource.

In the present design, the network side device can dynamically indicate the scheduling resource for the first data to the terminal by the scheduling response, which is beneficial to improve the flexibility of resource adjustment of the high latency service data.

In a possible example, the third data is data of the second service transmitted on the first resource.

In the present design, since the third data is the data of the second service transmitted on the first resource, that is, the terminal transmits only the part of the data affected by the puncturing transmission of the first data on the third resource without adding any additional data, thereby improving the data transmission efficiency while ensuring that the network side device can correctly receive the second data as far as possible.

In a possible example, the programs further include instructions for performing the following steps:

sending configuration information for a location of the first data before receiving the third data on the third resource; wherein the configuration information for the location of the first data is configured to determine the third data by the terminal.

In the design, the terminal can determine the third data according to the configuration information for the location of the first data, and the configuration information can be dynamically assigned by the network side device, and the adjustment is flexible.

In a possible example, a parameter of a hybrid automatic repeat request HARQ transmitted on the second resource is the same as the parameter of the HARQ transmitted on the third resource.

In a possible example, the programs further include instructions for performing the following steps:

performing a bundling feedback operation on the third data and a fourth data after receiving the third data on the third resource, wherein the fourth data is data of the second service received by the network side device on the second resource.

In the present example, the network side device may perform the bundling feedback operation after receiving the third data and the fourth data, so that the network side device does not separately generate a HARQ feedback for the fourth data on the MAC layer, but waits for completing the receiving of the affected data in the initial transmission data of the second service (the affected data in the initial transmission data is the third data) on the additional second resource, and after this, the HARQ feedback is generated, which is beneficial to improve the data processing efficiency and real-time performance of the initial transmission data of the second service.

The foregoing describes the solutions of the embodiments of the present disclosure mainly from the perspective of interactions between the network elements. It can be understood that the terminal and the network side device include corresponding hardware structures and/or software modules in order to implement the above functions. Those skilled in the art will readily appreciate that units and algorithm steps in embodiments of the present disclosure can be implemented in a form of hardware or a combination of hardware and computer software. Whether a function is implemented by means of hardware or computer software driven by hardware depends on the specific application and design constraints of the technical solutions. A person skilled in the art can use different methods for implementing the described functions for each particular application, but such implementation should not be considered to be beyond the scope of the present disclosure.

In the embodiments of the present disclosure, the division of functional units may be performed for the terminal and the network side device according to the foregoing method embodiments. For example, each functional unit may be divided into function units, or two or more functions may be integrated into one processing unit. The above integrated unit can be implemented in the form of hardware or in the form of software program module. It should be noted that the division of the units in the embodiments of the present disclosure is illustrative, and is only a logical function division. In actual implementations, there may be other division manners.

Figure 7:
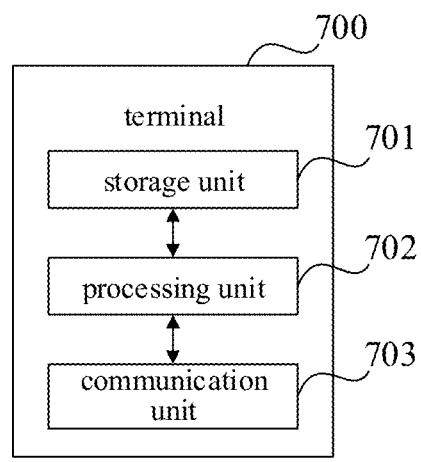
FIG. 7 is a structural block diagram showing functional units of a terminal provided by an embodiment of the present disclosure.

In the case of employing integrated units, FIG. 7 shows a block diagram of possible functional units of a terminal involved in the above embodiments. The terminal 700 includes a processing unit 702 and a communication unit 703. The processing unit 702 is configured to control and manage the actions of the terminal. For example, the processing unit 702 is configured to support the terminal to perform steps 501 and 503 in FIG. 5 and/or other processes for the techniques described herein. The communication unit 703 is configured to support the communications of the terminal with other devices, such as communications with the network side device shown in FIG. 6B. The terminal may further include a storage unit 701 configured to store program codes and data of the terminal.

The processing unit 702 may be a processor or a controller, and may be, for example, a central processing unit (CPU), a general-purpose processor, a digital signal processor (DSP), an application-specific integrated circuit (ASIC), field programmable gate array (FPGA) or other programmable logic device, transistor logic device, hardware component, or any combination thereof. It is possible to implement or carry out the various illustrative logical blocks, modules and circuits described in connection with the present disclosure. The processor may also be a combination for realizing computing functions, such as a combination of one or more microprocessor, a combination of a DSP and a microprocessor, and the like. The communication unit 703 may be a transceiver, a transceiver circuit, or the like. The storage unit 701 may be a memory.

When the processing unit 702 is a processor, the communication unit 703 is a communication interface, and the storage unit 701 is a memory, the terminal involved in the embodiment of the present disclosure may be the terminal shown in FIG. 6A.

Figure 8:
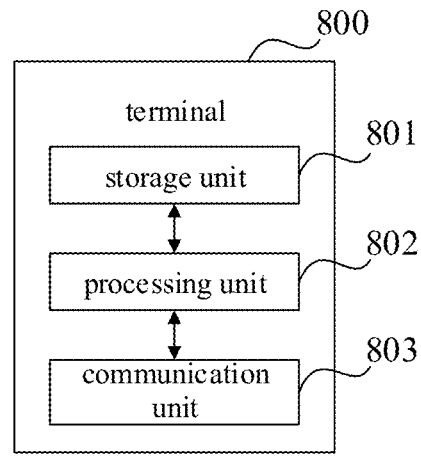
FIG. 8 is a structural block diagram showing functional units of a network side device provided by an embodiment of the present disclosure.

In the case of employing integrated units, FIG. 8 is a block diagram showing possible functional units of the network side device involved in the above embodiments. The network side device 800 includes a processing unit 802 and a communication unit 803. The processing unit 802 is configured to control and manage the actions of the network side device. For example, the processing unit 802 is configured to support the network side device to perform steps 502 and 504 in FIG. 5 and/or other processes for the techniques described herein. The communication unit 803 is configured to support the communications of the network side device with other devices, such as communications with the terminal shown in FIG. 6A. The network side device may further include a storage unit 801 configured to store program codes and data of the terminal.

The processing unit 802 may be a processor or a controller, and may be, for example, a CPU, a DSP, an ASIC, FPGA or other programmable logic device, transistor logic device, hardware component, or any combination thereof. It is possible to implement or carry out the various illustrative logical blocks, modules and circuits described in connection with the present disclosure. The processor may also be a combination for realizing computing functions, such as a combination of one or more microprocessor, a combination of a DSP and a microprocessor, and the like. The communication unit 803 may be a transceiver, a transceiver circuit, or the like. The storage unit 801 may be a memory.

When the processing unit 802 is a processor, the communication unit 803 is a communication interface, and the storage unit 801 is a memory, the network side device according to the embodiments of the present disclosure may be the network side device shown in FIG. 6B.

Figure 9:
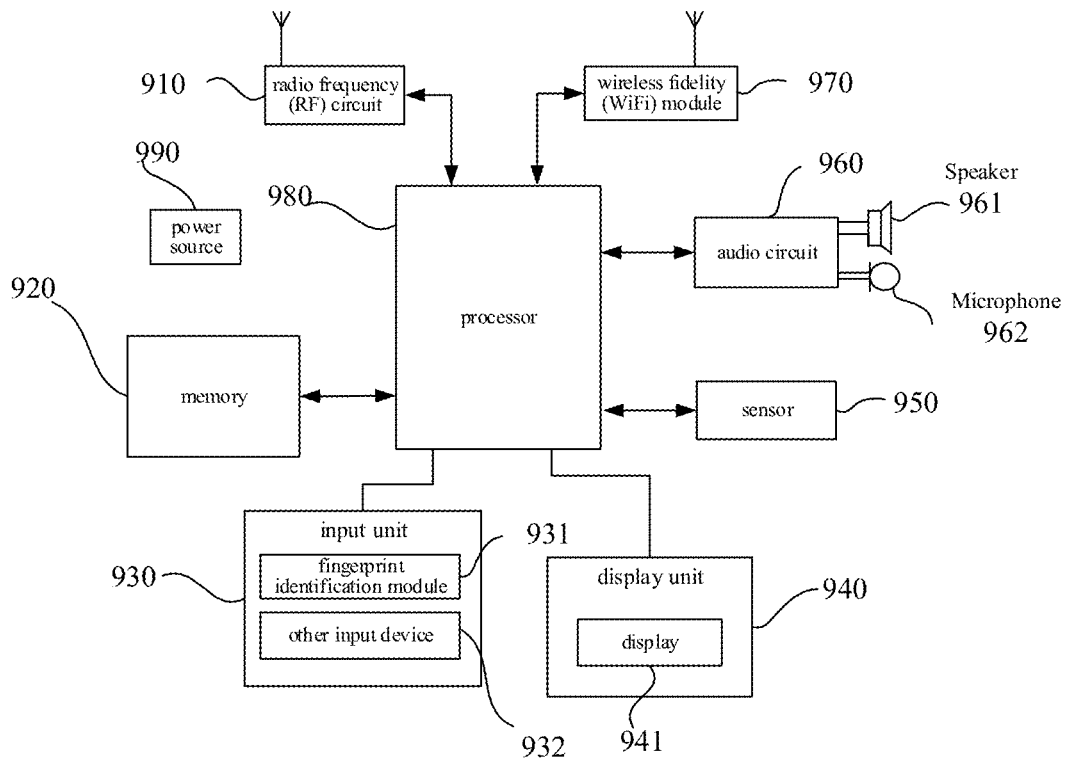
FIG. 9 is a schematic structural diagram of another terminal provided by an embodiment of the present disclosure.

An embodiment of the present disclosure further provides another terminal, as shown in FIG. 9. For the convenience of description, only the parts related to the embodiments of the present disclosure are shown. If the specific technical details are not disclosed, please refer to the method embodiments of the present disclosure. The terminal can be any terminal device, such as a mobile phone, a tablet computer, a PDA (Personal Digital Assistant), a POS (Point of Sales), an in-vehicle computer and so on. In the following descriptions, the terminal is a mobile phone as an example.

FIG. 9 is a block diagram showing a partial structure of a mobile phone related to a terminal according to an embodiment of the present disclosure. Referring to FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980, a power source 990 and other components. It will be understood by those skilled in the art that the structure of the mobile phone shown in FIG. 9 does not constitute a limitation to the mobile phone, and may include more or less components than those illustrated, or some components may be combined, or different components may be arranged.

The components of the mobile phone will be described below in detail with reference to FIG. 9.

The RF circuit 910 can be configured to receive and transmit information. Generally, RF circuit 910 includes, but is not limited to, an antenna, at least one amplifier, a transceiver, a coupler, a low noise amplifier (LNA), a duplexer, and the like. In addition, the RF circuitry 910 can also communicate with networks and other devices via wireless communication. The above wireless communication may use any communication standard or protocol, including but not limited to global system of mobile communication (GSM), general packet radio service (GPRS), code division multiple access (CDMA), wideband code division multiple access (WCDMA), long term evolution (LTE), E-mail, short messaging service (SMS), and the like.

The memory 920 can be configured to store software programs and modules, and the processor 980 executes various functional applications and data processing of the mobile phone by running software programs and modules stored in the memory 920. The memory 920 may mainly include a program storage area and a data storage area, wherein the program storage area may store an operating system, at least one application required for a function, and the like; the data storage area may store data created according to use of the mobile phone, and the like. Moreover, the memory 920 can include high speed random access memory, and can also include non-volatile memory, such as at least one of magnetic disk storage device, flash device, or other volatile solid state storage device.

The input unit 930 can be configured to receive input numeric or character information and to generate key signal inputs related to user settings and function controls of the mobile phone. Specifically, the input unit 930 can include a fingerprint identification module 931 and other input devices 932. The fingerprint identification module 931 can collect fingerprint data of users thereon. In addition to the fingerprint identification module 931, the input unit 930 may also include other input devices 932. Specifically, other input devices 932 may include, but are not limited to, one or more of a touch screen, a physical keyboard, function keys (such as volume control buttons, switch buttons, etc.), trackballs, mouse, joysticks, and the like.

The display unit 940 can be configured to display information input by the user or information provided to the user as well as various menus of the mobile phone. The display unit 940 can include a display screen 941. Alternatively, the display screen 941 can be configured in the form of a liquid crystal display (LCD), an organic light-emitting diode (OLED), or the like. Although the fingerprint identification module 931 and the display screen 941 are shown as two separate components to implement the input and display functions of the mobile phone in FIG. 9, the fingerprint identification module 931 and the display screen 941 may be integrated to achieve the input and play functions of the mobile phone in some embodiments.

The mobile phone may also include at least one type of sensor 950, such as a light sensor, motion sensor, and other sensors. Specifically, the light sensor may include an ambient light sensor and a proximity sensor. The ambient light sensor may adjust the brightness of the display screen 941 according to the brightness of the ambient light, and the proximity sensor may turn off the display screen 941 or backlight when the mobile phone moves to user's ear. As a kind of motion sensor, an accelerometer sensor can detect acceleration of each direction (usually three axes), and a magnitude and direction of gravity at rest. The accelerometer sensor can be configured to identify the gesture of the mobile phone (such as horizontal and vertical screen switching, related games, magnetometer gesture calibration), and recognize vibration-related functions (such as pedometer, tapping), etc. Other sensors such as gyroscopes, barometers, hygrometers, thermometers, infrared sensors, etc. can be configured on the mobile phone, which will not be described here.

An audio circuit 960, a speaker 961, and a microphone 962 can provide an audio interface between a user and the mobile phone. The audio circuit 960 can transmit the converted electrical data of the received audio data to the speaker 961 which converts the signal into sound signal for play. On the other hand, the microphone 962 converts the collected sound signal into an electrical signal which is converted into audio data after revived by the audio circuit 960. Then the audio data is processed by the processor 980; after the processing, the audio data is sent to another the mobile phone via RF circuit 910 or is stored to the memory 920 for further processing.

WiFi is a short-range wireless transmission technology, and the mobile phone can help users send and receive emails, browse web pages, and access streaming media through the WiFi module 970. The WiFi technology provides users with wireless broadband Internet access. Although FIG. 9 shows the WiFi module 970, it can be understood that it does not belong to a necessary part of the mobile phone, and can be omitted as needed and such omission is within the scope of the present disclosure without changing the essence of the present disclosure.

The processor 980 is the control center of the mobile phone, which is connected to various portions of the entire the mobile phone using various interfaces and lines, and monitors overall operation of the mobile phone by running or executing software programs and/or modules stored in the memory 920, calling data stored in the memory 920, executing various functions of the mobile phone and processing data. Optionally, the processor 980 may include one or more processing units; preferably, the processor 980 may be integrated with an application processor and a modem processor. The application processor mainly processes the operating system, a user interface, applications, and the like; the modem processor mainly processes wireless communications. It will be appreciated that the above described modem processor may also not be integrated into the processor 980.

The mobile phone also includes a power source 990 (such as a battery) that supply power to the various components. Preferably, the power source can be logically coupled to the processor 980 via a power management system to realize to management of charging, discharging, and power consumption management functions through the power management system.

Although not shown, the mobile phone may further include a camera, a Bluetooth module, and the like, and details are not described herein.

In the foregoing embodiment shown in FIG. 5A, the processes on the terminal side in the method embodiments may be implemented based on the structure of the mobile phone.

In the foregoing embodiments shown in FIG. 7 and FIG. 8, each unit function can be implemented based on the structure of the mobile phone.

Embodiments of the present disclosure also provide a computer readable storage medium, wherein the computer readable storage medium stores a computer program for electronic data exchange, wherein the computer program causes a computer to perform some or all of the steps performed by the terminal as described in the method embodiments.

Embodiments of the present disclosure also provide a computer readable storage medium, wherein the computer readable storage medium stores a computer program for electronic data exchange, wherein the computer program causes a computer to perform some or all of the steps performed by the network side device as described in the method embodiments.

Embodiments of the present disclosure also provide a computer program product, wherein the computer program product includes a non-transitory computer readable storage medium storing a computer program, the computer program being operative to cause a computer to perform some or all of the steps of the terminal as described in the method embodiments. The computer program product can be a software installation package.

The embodiment of the invention further provides a computer program product, wherein the computer program product comprises a non-transitory computer readable storage medium storing a computer program, the computer program being operative to cause a computer to perform some or all of the steps of the network side device as described in the method embodiments. The computer program product can be a software installation package.

The steps of the methods or algorithms described in the embodiments of the present disclosure may be implemented in a form of hardware, or may be implemented by a processor executing software instructions. The software instructions may be composed of corresponding software modules, which may be stored in a random access memory (RAM), a flash memory, a read only memory (ROM), an erasable programmable read only memory (Erasable Programmable ROM (EPROM), an electrically erasable programmable read only memory (EEPROM), registers, hard disk, removable hard disk, compact disk read only (CD-ROM) or any other form of storage medium known in the art. An exemplary storage medium is coupled to the processor to enable the processor to read information from, and write information to, the storage medium. Of course, the storage medium can also be a part of the processor. The processor and the storage medium can be located in an ASIC. Additionally, the ASIC can be located in an access network device, a target network device, or a core network device. Of course, the processor and the storage medium may also exist as discrete components in the access network device, the target network device, or the core network device.

Those skilled in the art should appreciate that in one or more of the above examples, the functions described in the embodiments of the present disclosure may be implemented in whole or in part by software, hardware, firmware, or any combination thereof. When implemented in software, all or a part of the functions may be implemented in the form of a computer program product. The computer program product includes one or more computer instructions. When the computer program instructions are loaded and executed on a computer, the processes or functions described in accordance with embodiments of the present disclosure are generated in whole or in part. The computer can be a general purpose computer, a special purpose computer, a computer network, or other programmable devices. The computer instructions can be stored in a computer readable storage medium or transmitted from one computer readable storage medium to another computer readable storage medium. For example, the computer instructions can be transmitted from a website, a computer, a server or a data center to another website, computer, server, or data center via wires (e.g., coaxial cable, fiber optic, digital subscriber line (DSL)) or wirelessly (e.g., infrared, wireless, microwave, etc.). The computer readable storage medium can be any available medium that can be accessed by a computer or a data storage device such as a server, a data center, or the like that includes one or more available mediums. The available medium may be a magnetic medium (such as, a floppy disk, a hard disk, a magnetic tape), an optical medium (such as, a digital video disc (DVD)), or a semiconductor medium (such as, a solid state disk (SSD)) or the like.

The specific embodiments described above further explain the objectives, technical solutions and beneficial effects of the embodiments of the present disclosure. It should be understood that the above description is only exemplary embodiments of the present disclosure, and is not intended to limit the protection scope of the present disclosure. Any modifications, equivalent substitutions, improvements, etc., which are made on the basis of the technical solutions of the embodiments of the present disclosure, should be included in the protection scope of the embodiments of the present disclosure.

What is claimed is:

1. A data transmission method, comprising:
   reusing, by a terminal, a first resource to transmit first data to a network side device, wherein the first data is data of a first service, the first resource is a resource in a second resource for transmitting second data, the second data is initial transmission data of a second service, a latency requirement of the first service is higher than a latency requirement of the second service; and
   retransmitting, by the terminal, third data on a third resource, wherein the third data is all or part of the second data, not waiting for the network side device to re-initiate scheduling of the second data;
   wherein before the terminal reuses a first resource to transmit first data, the method further comprises:
   receiving, by the terminal, a downlink control signaling (DCI), wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

2. The method according to claim 1, wherein reusing, by the terminal, a first resource to transmit first data comprises:
   transmitting, by the terminal, a scheduling request for the first data;
   receiving, by the terminal, a scheduling response to the scheduling request, and reusing the first resource to transmit the first data according to the scheduling response; or
   reusing, by the terminal, the first resource to transmit the first data according to a preset grant-free strategy.

3. The method according to claim 1, wherein the third data is data of the second service transmitted on the first resource.

4. The method according to claim 3, wherein before the terminal retransmits third data on a third resource, the method further comprises:
   receiving, by the terminal, configuration information for a location of the first data;
   determining, by the terminal, the third data according to the configuration information for the location of the first data; or
   determining, by the terminal, the third data according to resource location of the first data and a preset corresponding relationship between a coded block CB of the second data and a resource unit RE.

5. The method according to claim 1, wherein a parameter of a hybrid automatic repeat request HARQ transmitted on the second resource is the same as a parameter of a HARQ transmitted on the third resource.

6. A data transmission method, comprising:
   receiving, by a network side device, first data on a first resource sent from a terminal, wherein the first data is data of a first service, the first resource is a resource in a second resource for transmitting second data, the second data is initial transmission data of a second service, a latency requirement of the first service is higher than a latency requirement of the second service; and
   receiving, by the network side device, third data on a third resource, wherein the third data is all or part of the second data, wherein the network side device does not reinitiate scheduling of the second data;
   wherein before the network side device receives first data on a first resource, the method further comprises:
   sending, by the network side device, a downlink control signaling DCI, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for a terminal to self-schedule data.

7. The method according to claim 6, wherein receiving, by the network side device, first data on a first resource comprises:
   receiving, by the network side device, a scheduling request for the first data;
   sending, by the network side device, a scheduling response to the scheduling request, wherein the scheduling response is configured to indicate a terminal to reuse the first resource to send the first data; and
   receiving, by the network side device, the first data on the first resource.

8. The method according to claim 6, wherein the third data is data of the second service transmitted on the first resource.

9. The method according to claim 8, wherein before the network side device receives third data on a third resource, the method further comprises:
   sending, by the network side device, configuration information for a location of the first data, wherein the configuration information for the location of the first data is configured to determine the third data by the terminal.

10. The method according to claim 6, wherein a parameter of a hybrid automatic repeat request HARQ transmitted on the second resource is the same as a parameter of a HARQ transmitted on the third resource.

11. The method according to claim 6, wherein after the network side device receives third data on a third resource, the method further comprises:

performing, by the network side device, a bundling feedback operation on the third data and a fourth data, wherein the fourth data is data of the second service received by the network side device on the second resource.

12. A terminal, comprising: one or more processors, a memory, and one or more programs, wherein the one or more programs are stored in the memory and configured to be executed by the one or more processors, and the programs comprise instructions for performing the following steps:

reusing a first resource to transmit first data to a network side device, wherein the first data is data of a first service, the first resource is a resource in a second resource transmitting second data, the second data is initial transmission data of a second service, and a latency requirement of the first service is higher than a latency requirement of the second service; and retransmitting third data on a third resource, wherein the third data is all or part of the second data, not waiting for the network side device to re-initiate scheduling of the second data;

wherein the programs further comprise instructions for performing the following steps:

receiving a downlink control signaling (DCI) before reusing the first resource to transmit the first data, wherein uplink scheduling grant in the DCI comprises configuration information for the second resource and the third resource, the configuration information comprises first configuration information and second configuration information, the first configuration information is used to configure the second resource to be a resource reusable by the first service, and the second configuration information is used to configure the third resource to be a resource for the terminal to self-schedule data.

13. The terminal according to claim 12, wherein in terms of the reusing the first resource to transmit the first data, instructions in the programs are configured to perform the following steps:

transmitting a scheduling request for the first data;

receiving a scheduling response to the scheduling request, and reusing the first resource to transmit the first data according to the scheduling response; or reusing the first resource to transmit the first data according to a preset grant-free strategy.

14. The terminal according to claim 12, wherein the third data is data of the second service transmitted on the first resource.

15. The terminal of claim 14, wherein the programs further comprise instructions for performing the following steps:

receiving configuration information for a location of the first data before retransmitting the third data on the third resource; and determining the third data according to the configuration information for the location of the first data; or determining the third data according to resource location of the first data and a preset corresponding relationship between a coded block CB of the second data and a resource unit RE before retransmitting the third data on the third resource.

16. The terminal according to claim 12, wherein a parameter of a hybrid automatic repeat request HARQ transmitted on the second resource is the same as a parameter of a HARQ transmitted on the third resource.

* * * * *